United States Patent
Ishii et al.

(10) Patent No.: US 8,618,767 B2
(45) Date of Patent: Dec. 31, 2013

(54) CHARGING CONTROL APPARATUS FOR VEHICLE AND VEHICLE

(75) Inventors: Kenichi Ishii, Nishikamo-gun (JP); Ryuichi Kamaga, Nisshin (JP); Masahiro Karami, Obu (JP); Satoshi Fukui, Kobe (JP)

(73) Assignees: Toyota Jidosha Kabushiki Kaisha, Toyota (JP); Denso Corporation, Kariya (JP); Fujitsu Ten Limited, Kobe (JP)

( * ) Notice: Subject to any disclaimer, the term of this patent is extended or adjusted under 35 U.S.C. 154(b) by 754 days.

(21) Appl. No.: 12/676,686

(22) PCT Filed: Sep. 12, 2008

(86) PCT No.: PCT/JP2008/066515
§ 371 (c)(1),
(2), (4) Date: Mar. 5, 2010

(87) PCT Pub. No.: WO2009/035069
PCT Pub. Date: Mar. 19, 2009

(65) Prior Publication Data
US 2010/0213896 A1 Aug. 26, 2010

(30) Foreign Application Priority Data

Sep. 13, 2007 (JP) .................................. 2007-238322

(51) Int. Cl.
*H02J 7/00* (2006.01)
*H02J 7/14* (2006.01)

(52) U.S. Cl.
USPC ........... 320/104; 320/127; 320/141; 320/145; 320/139; 320/162

(58) Field of Classification Search
USPC ......... 320/104, 109, 103, 127, 129, 141, 143, 320/145, 148, 163, 157
See application file for complete search history.

(56) References Cited

U.S. PATENT DOCUMENTS

| 4,278,945 | A | | 7/1981 | Schröder et al. | |
| 5,635,804 | A | * | 6/1997 | Tanaka et al. | 318/139 |
| 5,736,831 | A | * | 4/1998 | Harrington | 320/104 |

(Continued)

FOREIGN PATENT DOCUMENTS

| DE | 101 02 170 A1 | 8/2001 |
| EP | 1 236 604 A2 | 9/2002 |

(Continued)

OTHER PUBLICATIONS

Korean Office Action dated Oct. 19, 2011 issued in Korean Patent Application No. KR10-2010-7007863 (with translation).

(Continued)

*Primary Examiner* — Edward Tso
*Assistant Examiner* — Alexis Boateng
(74) *Attorney, Agent, or Firm* — Oliff & Berridge, PLC

(57) ABSTRACT

A switch of a connecting circuit is connected between a signal line branched from an input terminal for a pilot signal in a charging inlet and a ground line connected to a vehicle earth, and is turned on/off in response to a control signal from a CPU. The CPU causes the switch to be turned on when a connector is not connected to the charging inlet, and detects a break in a control pilot line based on whether or not a change in the potential of the pilot signal occurs at that time.

9 Claims, 10 Drawing Sheets

(56) References Cited

U.S. PATENT DOCUMENTS

| | | | | |
|---|---|---|---|---|
| 5,757,595 | A * | 5/1998 | Ozawa et al. | 340/636.1 |
| 6,087,805 | A * | 7/2000 | Langston et al. | 320/109 |
| 7,778,746 | B2 * | 8/2010 | McLeod et al. | 701/22 |
| 8,299,748 | B2 * | 10/2012 | Soma et al. | 320/104 |
| 2001/0008192 | A1 | 7/2001 | Morisawa | |
| 2003/0162631 | A1 | 8/2003 | Williams | |
| 2004/0134698 | A1 | 7/2004 | Yamamoto et al. | |
| 2006/0052915 | A1 | 3/2006 | Sato | |
| 2008/0067974 | A1 * | 3/2008 | Zhang et al. | 320/104 |
| 2008/0180058 | A1 * | 7/2008 | Patel et al. | 320/109 |
| 2008/0284379 | A1 * | 11/2008 | Hirano | 320/150 |
| 2009/0096416 | A1 * | 4/2009 | Tonegawa et al. | 320/109 |

FOREIGN PATENT DOCUMENTS

| | | |
|---|---|---|
| EP | 1 645 475 A1 | 4/2006 |
| JP | A-7-123519 | 5/1995 |
| JP | A-9-161882 | 6/1997 |
| JP | A-10-203399 | 8/1998 |
| JP | A-2004-274945 | 9/2004 |
| JP | A-2005-6447 | 1/2005 |
| KR | 2003-008791 A | 11/2003 |
| RU | 2 048 309 CI | 11/1995 |
| RU | 2 282 301 C2 | 8/2006 |
| SU | 854286 | 8/1981 |

OTHER PUBLICATIONS

Decision on Grant for corresponding Russian Patent Application No. 2010114582, dated Dec. 21, 2010 (w/ English translation).

"SAE Electric Vehicle Conductive Charge Coupler," SAEJ1772, Nov. 2001, pp. 1-32, SAE International, U.S.A.

"Electric Vehicle Conductive Charging System: General Requirements," Japan Electric Vehicle Association Standard, Mar. 29, 2001, vol. 109, Japan Electric Vehicle Association (with translation).

Nov. 11, 2008 Search Report issued in International Patent Application No. PCT/JP2008/066515 (with translation).

Feb. 29, 2012 Extended Search Report issued in European Patent Application No. 08830063.7.

* cited by examiner

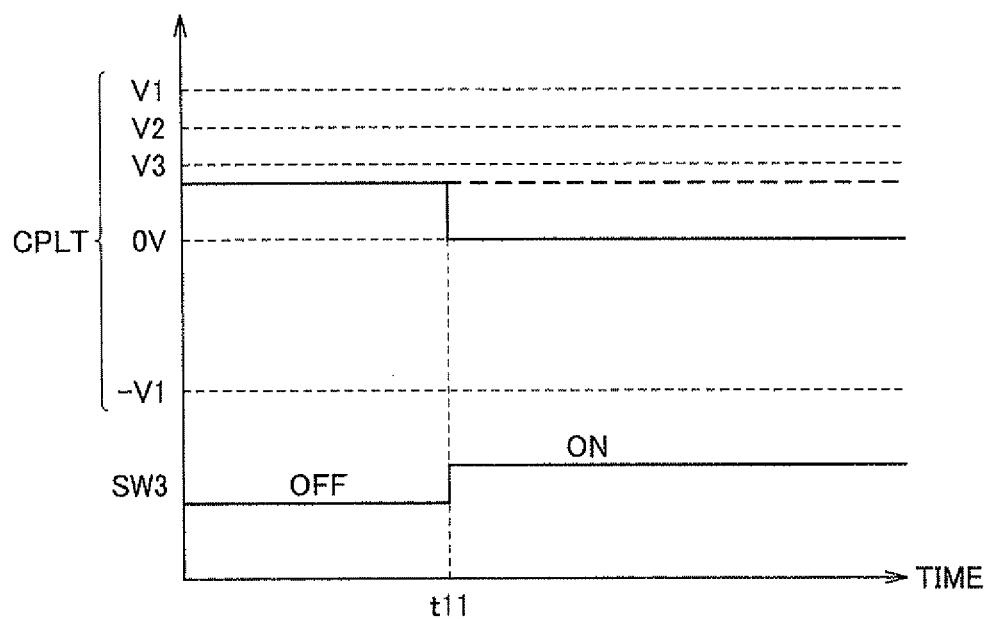
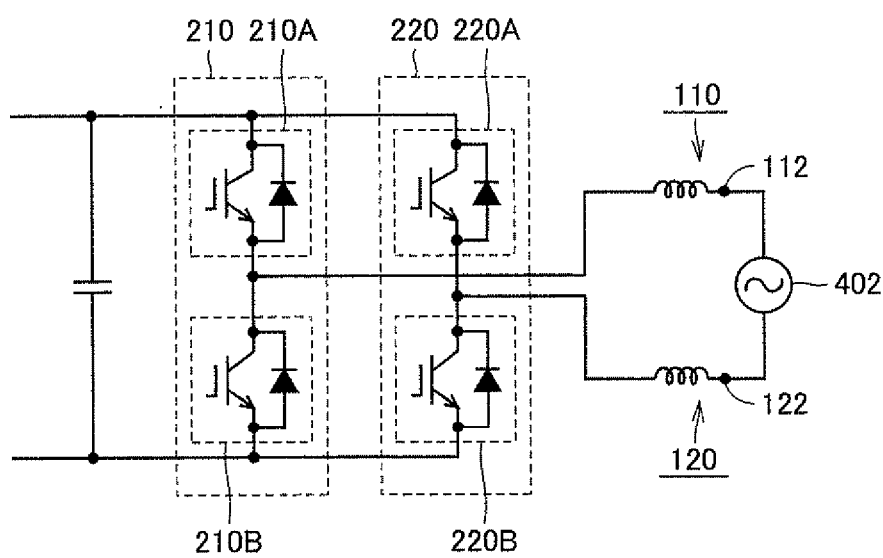

CHARGING CONTROL APPARATUS FOR VEHICLE AND VEHICLE

TECHNICAL FIELD

The present invention relates to a charging control apparatus for a vehicle and a vehicle. In particular, the present invention relates to a charging control apparatus for a vehicle and a vehicle configured to be capable of charging a power storage device for driving the vehicle from a power supply external to the vehicle.

BACKGROUND ART

In recent years, an electric vehicle, a hybrid vehicle, a fuel cell vehicle and the like have received attention as an environmentally-friendly vehicle. On these vehicles, a motor that generates driving force for traveling as well as a power storage device that stores electric power supplied to the motor are mounted. The hybrid vehicle further has an internal combustion engine mounted thereon as a power source, together with the motor. The fuel cell vehicle has a fuel cell mounted thereon as a direct current (DC) power supply for driving the vehicle.

Among these vehicles, a vehicle is known in which a vehicle-mounted power storage device for driving the vehicle can be charged from a power supply in ordinary households. For example, a power supply outlet provided at home is connected to a charging port provided at the vehicle by using a charging cable, so that electric power is supplied from the power supply in the ordinary households to the power storage device. It is noted that the vehicle in which the vehicle-mounted power storage device can be charged from the power supply external to the vehicle will also be referred to as "plug-in vehicle" hereinafter.

The standard for the plug-in vehicle is defined in "SAE Electric Vehicle Conductive Charge Coupler" (Non-Patent Document 1) in the United States of America, and in "Electric Vehicle Conductive Charging System, General Requirements" (Non-Patent Document 2) in Japan.

In "SAE Electric Vehicle Conductive Charge Coupler" and "Electric Vehicle Conductive Charging System, General Requirements," the standard for a control pilot is defined as an example. The control pilot is defined as a control line that connects, via a control circuit on the vehicle side, a ground of the vehicle and a control circuit of EVSE (Electric Vehicle Supply Equipment) for supplying electric power from an on-premises wiring to the vehicle, Based on a pilot signal communicated through this control line, a connection state of the charging cable, whether or not electric power is supplied from the power supply to the vehicle, a rated current of the EVSE and the like are determined, Patent Document 1: Japanese Patent Laying-Open No. 9-161882

Non-Patent Document 1: "SAE Electric Vehicle Conductive Charge Coupler," (the United States of America), SAE Standards, SAE International, November, 2001

Non-Patent Document 2: "Electric Vehicle Conductive Charging System, General Requirements," Japan Electric Vehicle Association Standard (Japan Electric Vehicle Standard), Mar. 29, 2001

DISCLOSURE OF THE INVENTION

Problems to be Solved by the Invention

"SAE Electric Vehicle Conductive Charge Coupler" and "Electric Vehicle Conductive Charging System, General Requirements," however, do not particularly define the details of a technique of detecting a break in the control line through which the pilot signal is communicated. For example, based on only a simple fact that the potential of the control line is in the ground level, it cannot be distinguished whether it means a break in the control line, an interruption of a power supply, removal of the charging cable from an outlet, or the like.

As described above, the pilot signal is essential for control of charging of the plug-in vehicle, and detection of an abnormality in the pilot signal, particularly detection of a break in the control line through which the pilot signal is communicated, is extremely important in the plug-in vehicle.

Thus, the present invention has been made to solve the above problems, and an object thereof is to provide a charging control apparatus for a vehicle capable of detecting a break in a control line through which a pilot signal is communicated.

In addition, another object of the present invention is to provide a vehicle capable of detecting a break in a control line through which a pilot signal is communicated.

Means for Solving the Problems

According to the present invention, a charging control apparatus for a vehicle is directed to a charging control apparatus for a vehicle configured to be capable of charging a vehicle-mounted power storage device for driving the vehicle from a power supply external to the vehicle, including: an EVSE controller; a resistance circuit; and a connecting circuit. The EVSE controller is provided outside the vehicle and configured to be capable of generating a pilot signal (pilot signal CPLT) whose pulse width is modulated based on a magnitude of a rated current that can be supplied to the vehicle through a charging cable for supplying electric power to the vehicle from the power supply external to the vehicle, and sending the pilot signal to the vehicle. The resistance circuit is mounted on the vehicle, connected to a control pilot line through which the pilot signal from the EVSE controller is communicated, and configured to be capable of changing a potential of the pilot signal stepwise. The connecting circuit is mounted on the vehicle and configured to be capable of electrically connecting the control pilot line to a vehicle earth.

Preferably, the charging control apparatus for a vehicle further includes a vehicle inlet. The vehicle inlet is provided at the vehicle and configured to be capable of connecting to the charging cable. The connecting circuit is configured to be capable of electrically connecting, to the vehicle earth, a terminal that receives the pilot signal from the EVSE controller in the vehicle inlet.

More preferably, the connecting circuit includes a branched line and a switch. The branched line is branched from a portion connecting the terminal and the control pilot line in the vehicle inlet. The switch is connected between the branched line and the vehicle earth.

Preferably, the charging control apparatus for a vehicle further includes: a vehicle inlet; a voltage generating circuit; and a break detecting device. The vehicle inlet is provided at the vehicle and configured to be capable of connecting to the charging cable. The voltage generating circuit is configured to be capable of generating a voltage at the control pilot line. The break detecting device detects a break in the control pilot line, based on whether or not a change in the potential of the control pilot line occurs when the connecting circuit electrically connects the control pilot line to the vehicle earth, in the case where the charging cable is not connected to the vehicle inlet.

More preferably, the charging control apparatus for a vehicle further includes: a connection signal generating circuit; an opening/closing detecting device; and a vehicle speed detecting device. The connection signal generating circuit is configured to be capable of generating a connection signal (cable connection signal PISW) indicating connection between the charging cable and the vehicle. The opening/closing detecting device detects an open or close state of a lid of the vehicle inlet. The vehicle speed detecting device detects a speed of the vehicle. The break detecting device determines whether or not the charging cable is connected to the vehicle inlet based on at least one of the connection signal and each detection signal from the opening/closing detecting device and the vehicle speed detecting device, and detects a break in the control pilot line when determining that the charging cable is not connected to the vehicle inlet.

In addition, according to the present invention, a vehicle is directed to a vehicle configured to be capable of charging a power storage device for driving the vehicle from a power supply external to the vehicle, including: a control pilot line; a resistance circuit; and a connecting circuit. The control pilot line is configured to be capable of transmitting a pilot signal (pilot signal CPLT) whose pulse width is modulated based on a magnitude of a rated current that can be supplied to the vehicle through a charging cable for supplying electric power from the power supply to the vehicle. The resistance circuit is connected to the control pilot line and configured to be capable of changing a potential of the pilot signal stepwise. The connecting circuit is configured to be capable of electrically connecting the control pilot line to a vehicle earth.

Preferably, the vehicle further includes a vehicle inlet. The vehicle inlet is configured to be capable of connecting to the charging cable. The connecting circuit is configured to be capable of electrically connecting, to the vehicle earth, a terminal that receives the pilot signal from outside the vehicle in the vehicle inlet.

More preferably, the connecting circuit includes a branched line and a switch. The branched line is branched from a portion connecting the terminal and the control pilot line in the vehicle inlet. The switch is connected between the branched line and the vehicle earth.

Preferably, the vehicle further includes: a vehicle inlet; a voltage generating circuit; and a break detecting device. The vehicle inlet is configured to be capable of connecting to the charging cable. The voltage generating circuit is configured to be capable of generating a voltage at the control pilot line. The break detecting device detects a break in the control pilot line, based on whether or not a change in the potential of the control pilot line occurs when the connecting circuit electrically connects the control pilot line to the vehicle earth, in the case where the charging cable is not connected to the vehicle inlet.

More preferably, the vehicle further includes: an opening/closing detecting device; and a vehicle speed detecting device. The opening/closing detecting device detects an open or close state of a lid of the vehicle inlet. The vehicle speed detecting device detects a speed of the vehicle. The break detecting device determines whether or not the charging cable is connected to the vehicle inlet, based on at least one of a connection signal (cable connection signal PISW) indicating connection between the charging cable and the vehicle as well as each detection signal from the opening/closing detecting device and the vehicle speed detecting device, and detects a break in the control pilot line when determining that the charging cable is not connected to the vehicle inlet.

Preferably, the vehicle further includes a charger for converting the electric power supplied from the power supply external to the vehicle to a voltage level of the power storage device and charging the power storage device.

EFFECTS OF THE INVENTION

According to the present invention, since the connecting circuit is configured to be capable of electrically connecting the control pilot line through which the pilot signal is communicated to the vehicle earth, a break in the control pilot line can be detected based on whether or not a change in the potential of the control pilot line occurs when the connecting circuit electrically connects the control pilot line to the vehicle earth.

In addition, according to the present invention, during charging of the power storage device from the power supply external to the vehicle, the connecting circuit is set to the non-connected state, and thereby the voltage level of the pilot signal is not affected. When the charging cable is not connected to the vehicle inlet, the connecting circuit is set to the connected state, and thereby a break in the control pilot line can be detected.

BRIEF DESCRIPTION OF THE DRAWINGS

FIG. 9 is a timing chart of the pilot signal and the switch at the time of detection of a break in a control pilot line.

FIG. 10 illustrates a zero-phase equivalent circuit of first and second inverters as well as first and second MGs shown in FIG. 3.

Figure 1:
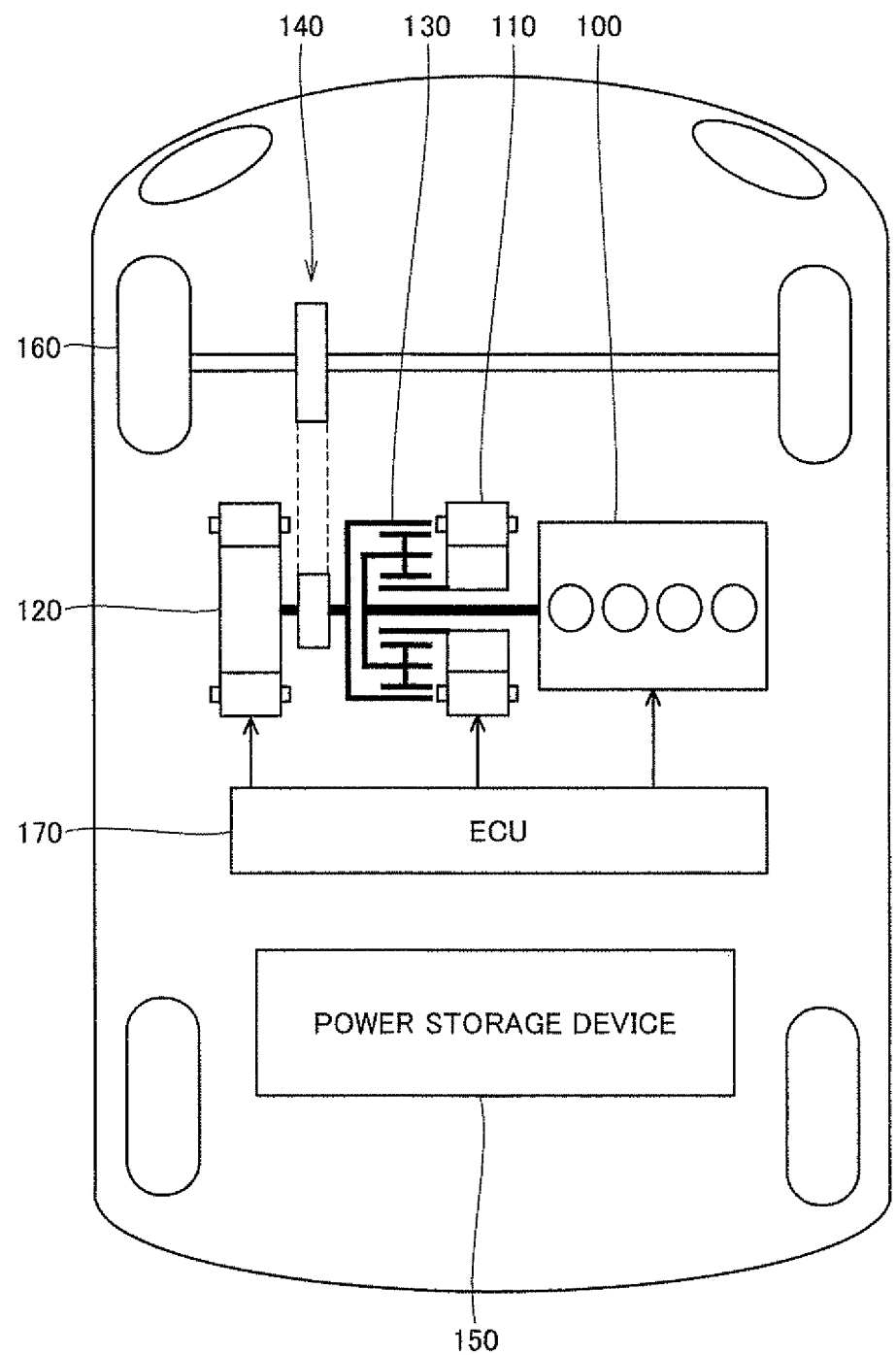
FIG. 1 is an overall block diagram of a plug-in hybrid vehicle shown as an example of a vehicle to which a system activation apparatus according to an embodiment of the present invention is applied.

DESCRIPTION OF THE REFERENCE SIGNS 100 engine; 110 first MG; 112, 122 neutral point; 120 second MG; 130 power split device; 140 reduction gear; 150 power storage device; 160 front wheel; 170 ECU; 171, 604 voltage sensor; 172 current sensor; 200 converter; 210 first inverter; 210A, 220A upper arm; 210B, 220B lower arm; 220 second inverter; 250 SMR; 260 DFR; 270 charging inlet; 280 LC filter; 290 charging lid detecting device; 292 vehicle speed detecting device; 294 charger; 300 charging cable; 310 connector; 312 limit switch; 320 plug; 330 CCID; 332 relay; 334 EVSE controller; 400 power supply outlet; 402 power supply; 502 resistance circuit; 504 connecting circuit; 506 voltage generating circuit; 508, 510 input buffer; 512, 514 CPU; 516 power supply node; 518 vehicle earth; 602 oscillator; 606 electromagnetic coil; 608 leakage detector; R1 resistance element; R2, R3, R7 pull-down resistance; R4-R6 pull-up resistance; SW1-SW3 switch; D1-D3 diode; L1 control pilot line; L2, L4 signal line; L3 ground line; T1 input terminal

BEST MODES FOR CARRYING OUT THE INVENTION

Embodiments of the present invention will be hereinafter described in detail with reference to the drawings. The same or corresponding portions are represented by the same reference characters in the drawings, and description thereof will not be repeated.

FIG. 1 is an overall block diagram of a plug-in hybrid vehicle shown as an example of a vehicle to which a charging control apparatus according to an embodiment of the present invention is applied. Referring to FIG. 1, this plug-in hybrid vehicle includes an engine 100, a first MG (Motor Generator) 110, a second MG 120, a power split device 130, a reduction gear 140, a power storage device 150, a drive wheel 160, and an ECU 170.

Engine 100, first MG 110 and second MG 120 are coupled to power split device 130. This plug-in hybrid vehicle travels by using driving force from at least one of engine 100 and second MG 120. Motive power generated by engine 100 is split by power split device 130 into two paths, that is, one path through which the motive power is transmitted to drive wheel 160 via reduction gear 140, and the other through which the motive power is transmitted to first MG 110.

First MG 110 is an alternating current (AC) rotating electric machine, and is a three-phase AC synchronous motor including a U-phase coil, a V-phase coil and a W-phase coil, for example. First MG 110 generates electric power by using the motive power of engine 100 split by power split device 130. For example, when a state of charge (that will also be referred to as "SOC (State of Charge)" hereinafter) of power storage device 150 falls below a predetermined value, engine 100 starts and electric power is generated by first MG 110. The electric power generated by first MG 110 is converted from AC to DC by an inverter (that will be described hereinafter), voltage thereof is adjusted by a converter (that will be described hereinafter), and then the electric power is stored in power storage device 150.

Second MG 120 is an AC rotating electric machine, and is a three-phase AC synchronous motor including a U-phase coil, a V-phase coil and a W-phase coil, for example. Second MG 120 generates driving force by using at least one of the electric power stored in power storage device 150 and the electric power generated by first MG 110. The driving force of second MG 120 is transmitted to drive wheel 160 via reduction gear 140. As a result, second MG 120 assists engine 100 or causes the vehicle to travel by using the driving force from second MG 120. Although drive wheel 160 is shown as a front wheel in FIG. 1, a rear wheel may be driven by second MG 120, instead of the front wheel or together with the front wheel.

It is noted that, at the time of braking and the like of the vehicle, second MG 120 is driven by drive wheel 160 via reduction gear 140, and second MG 120 is operated as a generator. As a result, second MG 120 is operated as a regenerative brake for converting braking energy to electric power. The electric power generated by second MG 120 is stored in power storage device 150.

Power split device 130 is formed of a planetary gear including a sun gear, a pinion gear, a carrier, and a ring gear. The pinion gear engages the sun gear and the ring gear. The carrier rotatably supports the pinion gear, and in addition, is coupled to a crankshaft of engine 100. The sun gear is coupled to a rotation shaft of first MG 110. The ring gear is coupled to a rotation shaft of second MG 120 and reduction gear 140.

Figure 2:
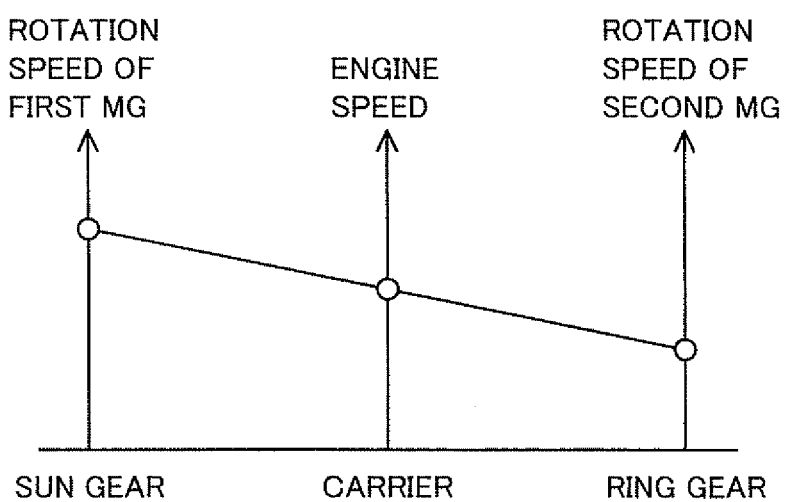
FIG. 2 illustrates a collinear chart of a power split device.

Engine 100, first MG 110 and second MG 120 are coupled with power split device 130 formed of the planetary gear being interposed therebetween, so that the relationship between rotation speeds of engine 100, first MG 110 and second MG 120 is such that they are connected by a straight line in a collinear chart as shown in FIG. 2.

Referring again to FIG. 1, power storage device 150 is a rechargeable DC power supply, and is formed of a secondary battery such as nickel-metal hydride and lithium ion, for example. The voltage of power storage device 150 is, for example, about 200V. In addition to the electric power generated by first MG 110 and second MG 120, electric power supplied from a power supply external to the vehicle is stored in power storage device 150, as will be described hereinafter. It is noted that a large-capacitance capacitor can also be employed as power storage device 150, and any electric power buffer may be employed if it can temporarily store the electric power generated by first MG 110 and second MG 120 as well as the electric power from the power supply external to the vehicle and supply the stored electric power to second MG 120.

Engine 100, first MG 110 and second MG 120 are controlled by ECU 170. It is noted that ECU 170 may be divided into a plurality of ECUs for each function. It is noted that a configuration of ECU 170 will be described hereinafter.

Figure 3:
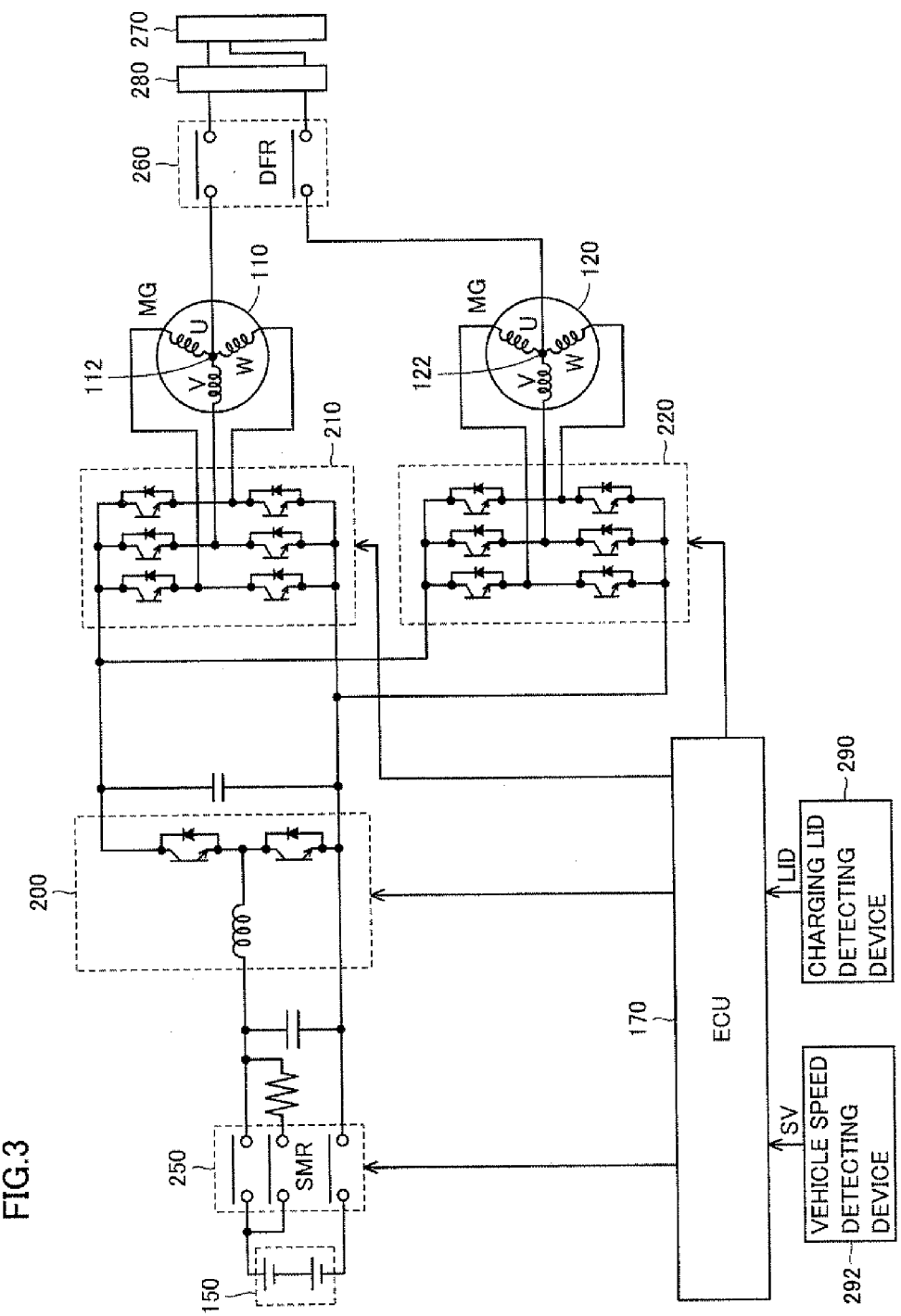
FIG. 3 is an overall configuration diagram of an electrical system in the plug-in hybrid vehicle shown in FIG. 1.

FIG. 3 is an overall configuration diagram of an electrical system in the plug-in hybrid vehicle shown in FIG. 1. Referring to FIG. 3, this electrical system includes power storage device 150, an SMR (System Main Relay) 250, a converter 200, a first inverter 210, a second inverter 220, first MG 110, second MG 120, a DFR (Dead Front Relay) 260, an LC filter 280, a charging inlet 270, a charging lid detecting device 290, and a vehicle speed detecting device 292.

SMR 250 is provided between power storage device 150 and converter 200. SMR 250 is a relay for electrically connecting/disconnecting power storage device 150 and the electrical system, and on/off of SMR 250 is controlled by ECU 170. In other words, when the vehicle travels and when power storage device 150 is charged from the power supply external to the vehicle, SMR 250 is turned on, and power storage device 150 is electrically connected to the electrical system. On the other hand, when the vehicle system stops, SMR 250 is turned off, and power storage device 150 is electrically disconnected from the electrical system.

Converter 200 includes a reactor, two npn-type transistors and two diodes. The reactor has one end connected to the positive electrode side of power storage device 150, and the other end connected to a connection node of the two npn-type transistors. The two npn-type transistors are connected in series, and each npn-type transistor has the diode connected in antiparallel.

It is noted that an IGBT (Insulated Gate Bipolar Transistor), for example, can be used as the npn-type transistor. Furthermore, a power switching element such as a power MOSFET (Metal Oxide Semiconductor Field-Effect Transistor) may be used instead of the npn-type transistor.

When electric power is supplied from power storage device 150 to first MG 110 or second MG 120, converter 200 boosts the electric power discharged from power storage device 150 and supplies the electric power to first MG 110 or second MG 120, based on a control signal from ECU 170. Furthermore, when power storage device 150 is charged, converter 200 steps down the electric power supplied from first MG 110 or second MG 120 and outputs the electric power to power storage device 150.

First inverter 210 includes a U-phase arm, a V-phase arm and a W-phase arm. The U-phase arm, the V-phase arm and the W-phase arm are connected in parallel. Each phase arm includes two npn-type transistors connected in series, and each npn-type transistor has a diode connected in antiparallel. A connection point between the two npn-type transistors in each phase arm is connected to an end of a corresponding coil in first MG 110 that is different from a neutral point 112.

First inverter 210 converts DC electric power supplied from converter 200 to AC electric power, and supplies the converted AC electric power to first MG 110. Furthermore, first inverter 210 converts AC electric power generated by first MG 110 to DC electric power, and supplies the converted DC electric power to converter 200.

Second inverter 220 also has a configuration similar to that of first inverter 210. A connection point between two npn-type transistors in each phase arm is connected to an end of a corresponding coil in second MG 120 that is different from a neutral point 122.

Second inverter 220 converts DC electric power supplied from converter 200 to AC electric power, and supplies the converted AC electric power to second MG 120. Furthermore, second inverter 220 converts AC electric power generated by second MG 120 to DC electric power, and supplies the converted DC electric power to converter 200.

In addition, when power storage device 150 is charged from the power supply external to the vehicle, first inverter 210 and second inverter 220 convert AC electric power provided from the power supply external to the vehicle to neutral point 112 of first MG 110 and neutral point 122 of second MG 120, to DC electric power, based on a control signal from ECU 170, and supply the converted DC electric power to converter 200 by using a method that will be described hereinafter.

DFR 260 is provided between a pair of power lines connected to neutral points 112, 122 and a pair of power lines connected to LC filter 280. DFR 260 is a relay for electrically connecting/disconnecting charging inlet 270 and the electrical system, and on/off of DFR 260 is controlled by ECU 170. In other words, when the vehicle travels, DFR 260 is turned off, and charging inlet 270 is electrically separated from the electrical system. On the other hand, when power storage device 150 is charged from the power supply external to the vehicle, DFR 260 is turned on, and charging inlet 270 is electrically connected to the electrical system.

LC filter 280 is provided between DFR 260 and charging inlet 270, and prevents output of a high-frequency noise from the electrical system of the plug-in hybrid vehicle to the power supply external to the vehicle when power storage device 150 is charged from the power supply external to the vehicle.

Charging inlet 270 serves as an electric power interface for receiving charging electric power from the power supply external to the vehicle, and as a vehicle inlet provided at the vehicle. When power storage device 150 is charged from the power supply external to the vehicle, a connector of a charging cable through which electric power is supplied to the vehicle from the power supply external to the vehicle is connected to charging inlet 270.

ECU 170 generates the control signals for driving SMR 250, converter 200, first inverter 210, and second inverter 220, and controls the operation of each of these devices.

Charging lid detecting device 290 detects the open or close state of a lid (charging lid) of an opening in which charging inlet 270 is housed, and outputs a lid signal LID indicating the open or close state to ECU 170. Vehicle speed detecting device 292 detects a vehicle speed SV of this plug-in hybrid vehicle, and outputs the detected value to ECU 170.

Figure 4:
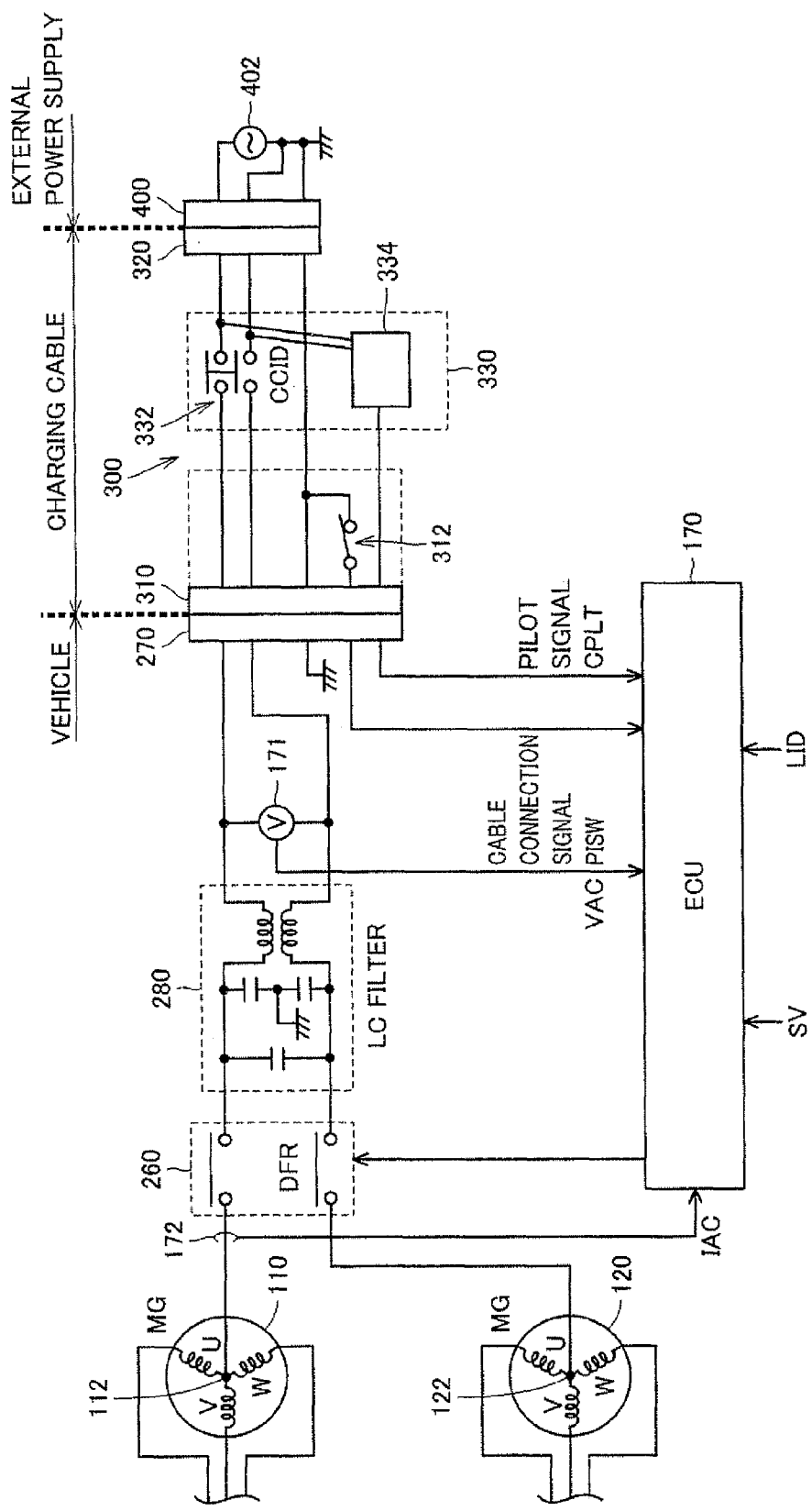
FIG. 4 is a schematic configuration diagram of a portion related to a charging mechanism of the electrical system shown in FIG. 3.

FIG. 4 is a schematic configuration diagram of a portion related to a charging mechanism of the electrical system shown in FIG. 3. Referring to FIG. 4, a charging cable 300 for coupling the plug-in hybrid vehicle and the power supply external to the vehicle includes a connector 310, a plug 320 and a CCID (Charging Circuit Interrupt Device) 330.

Connector 310 is configured to be capable of being connected to charging inlet 270 provided at the vehicle. A limit switch 312 is provided at connector 310. When connector 310 is connected to charging inlet 270, limit switch 312 is activated, and a cable connection signal PISW indicating that connector 310 is connected to charging inlet 270 is input to ECU 170.

Plug 320 is connected to a power supply outlet 400 provided at home, for example. AC electric power is supplied from a power supply 402 (for example, a system power supply) to power supply outlet 400.

CCID 330 includes a relay 332 and an EVSE controller 334. Relay 332 is provided in a pair of power lines through which charging electric power is supplied from power supply 402 to the plug-in hybrid vehicle. On/off of relay 332 is controlled by EVSE controller 334. When relay 332 is turned off, a conducting path through which electric power is supplied from power supply 402 to the plug-in hybrid vehicle is disconnected. On the other hand, when relay 332 is turned on, electric power can be supplied from power supply 402 to the plug-in hybrid vehicle.

When plug 320 is connected to power supply outlet 400, EVSE controller 334 is operated by the electric power supplied from power supply 402. EVSE controller 334 generates a pilot signal CPLT to be sent to ECU 170 of the vehicle through a control pilot line. When connector 310 is connected to charging inlet 270 and the potential of pilot signal CPLT is lowered to a prescribed value, EVSE controller 334 causes pilot signal CPLT to oscillate in a prescribed duty cycle (a ratio of a pulse width to an oscillation cycle).

This duty cycle is set based on a rated current that can be supplied from power supply 402 through charging cable 300 to the vehicle.

Figure 5:
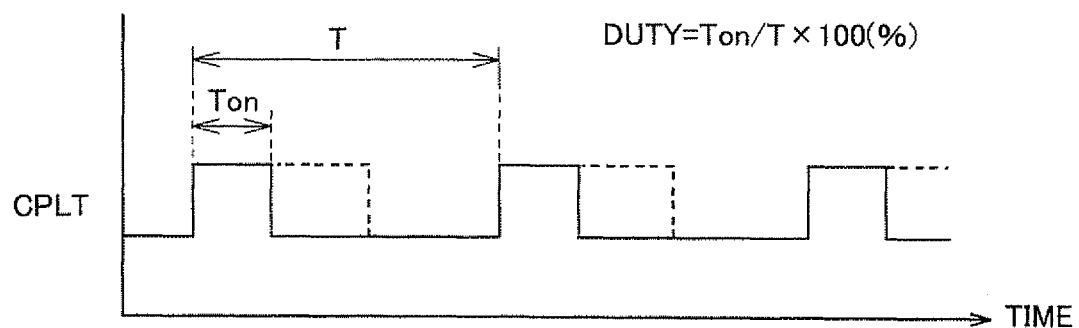
FIG. 5 illustrates a waveform of a pilot signal generated by an EVSE controller shown in FIG. 4.

FIG. 5 illustrates a waveform of pilot signal CPLT generated by EVSE controller 334 shown in FIG. 4. Referring to FIG. 5, pilot signal CPLT oscillates in a prescribed cycle T. Here, a pulse width Ton of pilot signal CPLT is set based on the rated current that can be supplied from power supply 402 through charging cable 300 to the vehicle. The notification of the rated current is provided from EVSE controller 334 to ECU 170 of the vehicle by using pilot signal CPLT, in accordance with the duty indicated by a ratio of pulse width Ton to cycle T.

It is noted that the rated current is defined for each charging cable. Depending on the type of the charging cable, the rated current varies, and therefore, the duty of pilot signal CPLT also varies. ECU 170 of the vehicle receives, through the control pilot line, pilot signal CPLT sent from EVSE controller 334 provided at charging cable 300, and senses the duty of received pilot signal CPLT, so that ECU 170 of the vehicle can sense the rated current that can be supplied from power supply 402 through charging cable 300 to the vehicle.

Referring again to FIG. 4, EVSE controller 334 causes relay 332 to be turned on when preparation for charging is completed on the vehicle side.

A voltage sensor 171 and a current sensor 172 are provided on the vehicle side. Voltage sensor 171 detects a voltage VAC across a pair of power lines provided between charging inlet 270 and LC filter 280, and outputs the detected value to ECU 170. Current sensor 172 detects a current IAC flowing through a power line between DFR 260 and neutral point 112 of first MG 110, and outputs the detected value to ECU 170. It is noted that current sensor 172 may be provided at a power line between DFR 260 and neutral point 122 of second MG 120.

Figure 6:
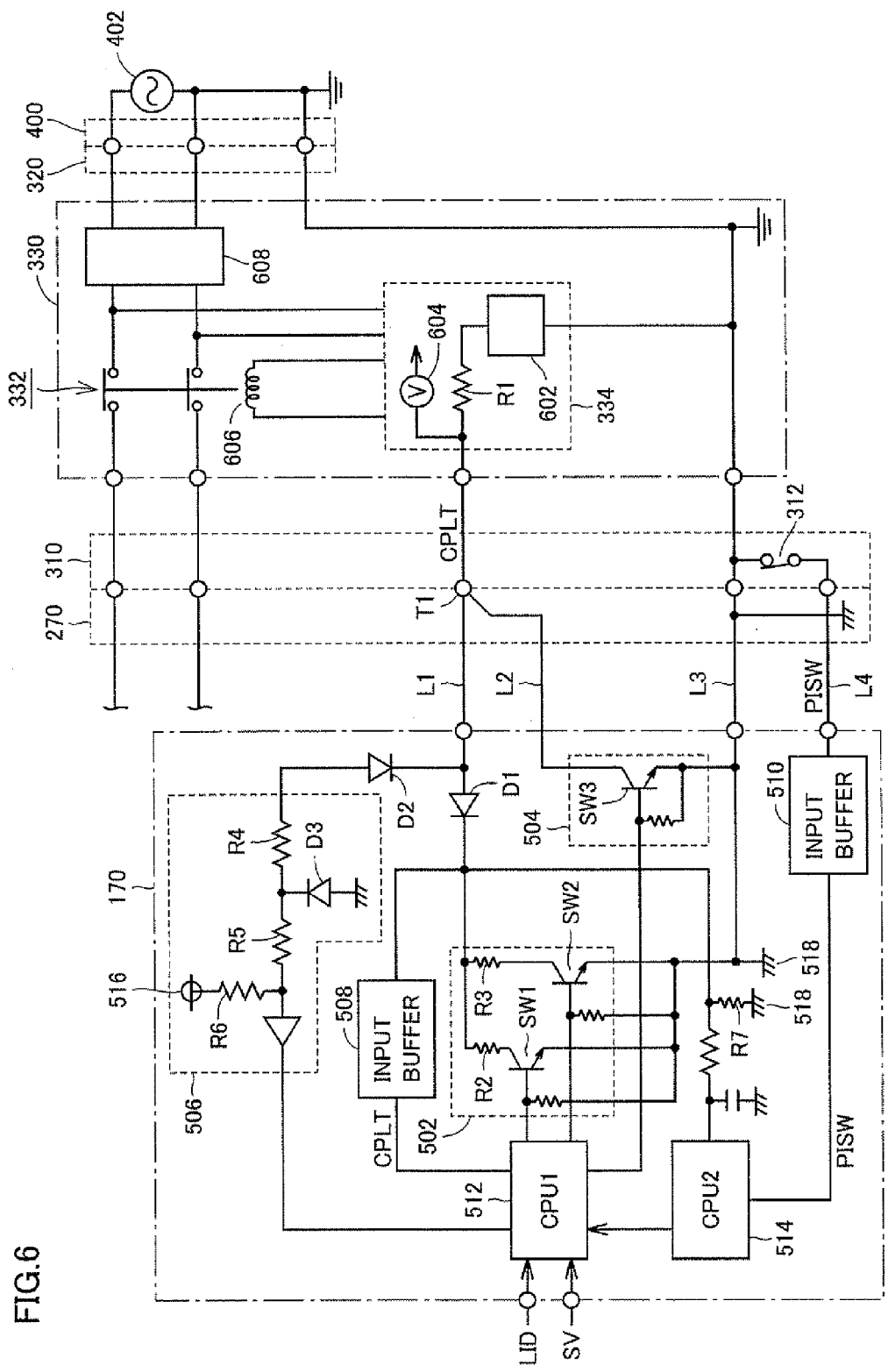
FIG. 6 illustrates the charging mechanism shown in FIG. 4 in more detail.

FIG. 6 illustrates the charging mechanism shown in FIG. 4 in more detail. Referring to FIG. 6, CCID 330 includes an electromagnetic coil 606 and a leakage detector 608, in addition to relay 332 and EVSE controller 334. EVSE controller 334 includes an oscillator 602, a resistance element R1 and a voltage sensor 604.

Oscillator 602 is operated by the electric power supplied from power supply 402. Oscillator 602 outputs a non-oscillating signal when the potential of pilot signal CPLT detected by voltage sensor 604 is around a prescribed potential V1 (for example, 12V), and outputs a signal that oscillates at a prescribed frequency (for example, 1 kHz) and duty cycle, when the potential of pilot signal CPLT is lowered from V1. It is noted that the potential of pilot signal CPLT is manipulated by switching a resistance value of resistance circuit 502 of ECU 170 as will be described hereinafter. In addition, the duty cycle is set based on the rated current that can be supplied from power supply 402 through the charging cable to the vehicle as described above.

In addition, EVSE controller 334 supplies a current to electromagnetic coil 606 when the potential of pilot signal CPLT is around a prescribed potential V3 (for example, 6V). When the current is supplied from EVSE controller 334, electromagnetic coil 606 generates electromagnetic force and relay 332 is turned on.

Leakage detector 608 is provided at a pair of power lines through which charging electric power is supplied from power supply 402 to the plug-in hybrid vehicle, and detects the presence or absence of leakage. Specifically, leakage detector 608 detects the equilibrium of the current flowing through the pair of power lines in the opposite direction, and senses the occurrence of leakage when the equilibrium is broken. It is noted that, although not specifically shown, when the leakage is detected by leakage detector 608, electric power supply to electromagnetic coil 606 is interrupted and relay 332 is turned off.

On the other hand, ECU 170 includes a resistance circuit 502, a connecting circuit 504, a voltage generating circuit 506, input buffers 508, 510, and CPUs (Control Processing Units) 512, 514.

Resistance circuit 502 includes pull-down resistances R2, R3 and switches SW1, SW2. Pull-down resistance R2 and switch SW1 are serially connected between a vehicle earth 518 and a control pilot line L1 through which pilot signal CPLT is communicated. Pull-down resistance R3 and switch SW2 are serially connected between vehicle earth 518 and control pilot line L1, and are connected in parallel to serially-connected pull-down resistance R2 and switch SW1. Switches SW1 and SW2 are turned on/off in response to a control signal from CPU 512.

This resistance circuit 502 switches the potential of pilot signal CPLT by turning on/off switches SW1 and SW2 in response to the control signal from CPU 512. In other words, when switch SW2 is turned on in response to the control signal from CPU 512, the potential of pilot signal CPLT is lowered to a prescribed potential V2 (for example, 9V) by pull-down resistance R3. When switch SW1 is further turned on in response to the control signal from CPU 512, the potential of pilot signal CPLT is lowered to prescribed potential V3 (for example, 6V) by pull-down resistances R2 and R3.

Connecting circuit 504 includes switch SW3. Switch SW3 is connected between a signal line L2 branched from an input terminal T1 for pilot signal CPLT in charging inlet 270 and a ground line L3 connected to vehicle earth 518. Switch SW3 is turned on/off in response to the control signal from CPU 512.

This connecting circuit 504 is provided to detect a break in control pilot line L1 through which pilot signal CPLT is communicated. In other words, when connector 310 is not connected to charging inlet 270, a voltage divided by pull-up resistances R4 to R6 within voltage generating circuit 506 and pull-down resistance R7 connected to vehicle earth 518 is generated at control pilot line L1. If the potential of control pilot line L1 is lowered to the ground level when switch SW3 of connecting circuit 504 is turned on, it can be determined that control pilot line L1 is normal. On the other hand, if the potential of control pilot line L1 is not lowered to the ground level even when switch SW3 is turned on, it can be determined that control pilot line L1 is broken within the vehicle.

It is noted that, by turning off switch SW3 when connector 310 is connected to charging inlet 270, that is, when power storage device 150 (FIG. 2) is charged from power supply 402, control of charging by using pilot signal CPLT is possible without affecting the potential of control pilot line L1 (potential of pilot signal CPLT). In other words, switch SW3 is turned of in response to the control signal from CPU 512 when connector 310 is connected to charging inlet 270, and is turned on in response to the control signal from CPU 512 when connector 310 is not connected to charging inlet 270.

Figure 7:
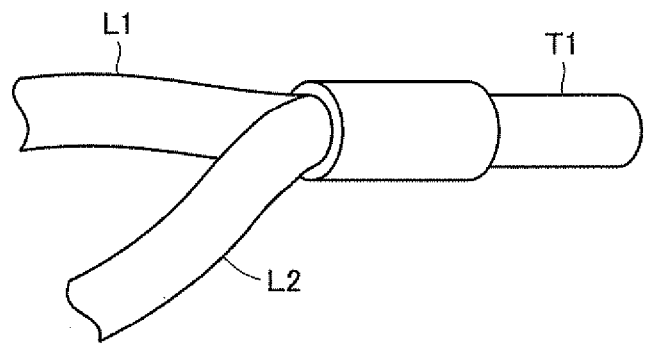
FIG. 7 illustrates a configuration of an input terminal for the pilot signal in a charging inlet shown in FIG. 6.

It is noted that signal line L2 having switch SW3 connected thereto is connected to control pilot line L1 in charging inlet 270. Since the structure of connector 310 connected to charging inlet 270 is standardized, it is difficult to change the structure of charging inlet 270 and the shape of input terminal T1 having control pilot line L1 connected thereto, in order to connect signal line L2 for detecting a break to control pilot line L1 in charging inlet 270. Thus, in the present embodiment, as shown in FIG. 7, signal line L2 is branched from a portion connecting control pilot line L1 and input terminal T1, and signal line L2 is connected to control pilot line L1 in charging inlet 270 without changing the structure of charging inlet 270 and the shape of input terminal T1.

Voltage generating circuit 506 includes a power supply node 516, pull-up resistances R4 to R6, and a diode D3. When connector 310 is not connected to charging inlet 270, this voltage generating circuit 506 generates, at control pilot line L1, a voltage set by a voltage of power supply node 516 (for example, 12V), pull-up resistances R4 to R6, and pull-down resistance R7 connected to vehicle earth 518.

Input buffer 508 receives pilot signal CPLT of control pilot line L1, and outputs received pilot signal CPLT to CPU 512. Input buffer 510 receives cable connection signal PISW from a signal line L4 connected to limit switch 312 of connector 310, and outputs received cable connection signal PISW to CPU 514.

It is noted that a voltage is applied to signal line L4 from ECU 170, and when connector 310 is connected to charging inlet 270, limit switch 312 is turned on and the potential of signal line L4 is set to the ground level. In other words, cable connection signal PISW is set to the L (logical low) level when connector 310 is connected to charging inlet 270, and is set to the H (logical high) level when connector 310 is not connected to charging inlet 270.

CPU 514 receives cable connection signal PISW from input buffer 510, and determines whether or not connector 310 is connected to charging inlet 270, based on received cable connection signal PISW. Then, CPU 514 outputs the result of the determination to CPU 512.

CPU 512 receives pilot signal CPLT from input buffer 508, and receives, from CPU 514, the result of the determination as to whether or not connector 310 is connected to charging inlet 270. When receiving the result of the determination that connector 310 is connected to charging inlet 270, CPU 512 renders the control signal to be output to switch SW2 active. Thereafter, CPU 512 detects the rated current that can be supplied from power supply 402 to the plug-in hybrid vehicle, based on pilot signal CPLT that starts to oscillate in response to the turning-on of switch SW2.

When the rated current is detected and preparation for charging power storage device 150 from power supply 402 is completed, CPU 512 further renders the control signal to be output to switch SW1 active, and further causes DFR 260 (not shown) to be turned on. As a result, AC electric power from power supply 402 is provided to neutral point 112 of first MG 110 and neutral point 122 of second MG 120 (both are not shown), and charging of power storage device 150 is controlled.

In addition, CPU 512 further receives lid signal LID from charging lid detecting device 290 and the detected value of vehicle speed SV from vehicle speed detecting device 292. Then, CPU 512 determines whether connector 310 is not connected to charging inlet 270, based on the result of the determination from CPU 514 as to whether or not connector 310 is connected to charging inlet 270, lid signal LID and vehicle speed SV. When determining that connector 310 is not connected to charging inlet 270, CPU 512 renders the control signal to be output to switch SW3 active. In other words, when the result of the determination as to connection from CPU 514 based on cable connection signal PISW is such that connector 310 is not connected to charging inlet 270, when the charging lid is closed and when the vehicle speed is not 0, CPU 512 determines that connector 310 is not connected to charging inlet 270, and causes switch SW3 for detecting a break to be turned on.

CPU 512 detects a break in control pilot line L1 based on whether or not a change in the potential of pilot signal CPLT occurs at this time. In other words, when the potential of pilot signal CPLT is lowered in response to activation of switch SW3, CPU 512 determines that control pilot line L1 is normal (no break). On the other hand, when the potential of pilot signal CPLT is not lowered in response to activation of switch SW3, CPU 512 determines that control pilot line L1 is broken.

It is noted that, in the above, not only the result of the determination as to connection from CPU 514 based on cable connection signal PISW but also lid signal LID and vehicle speed SV are set as the conditions when it is determined whether connector 310 is not connected to charging inlet 270, because it is determined more reliably that connector 310 is not connected to charging inlet 270.

In other words, during charging in which pilot signal CPLT is used for control, a break cannot be detected as described above, based on whether or not a change in the potential of pilot signal CPLT occurs when control pilot line L1 is electrically connected to vehicle earth 518. It is required to detect a break when it can be certainly made sure that the vehicle is not being charged. Thus, in the present embodiment, a break in control pilot line L1 is detected while the vehicle is traveling (that is, while the vehicle is not being charged), and a condition that the charging lid is closed as well as a condition that the vehicle speed is not 0 are set as the conditions for the detection of a break, in addition to the determination that connector 310 is not connected to charging inlet 270 based on cable connection signal PISW.

Figure 8:
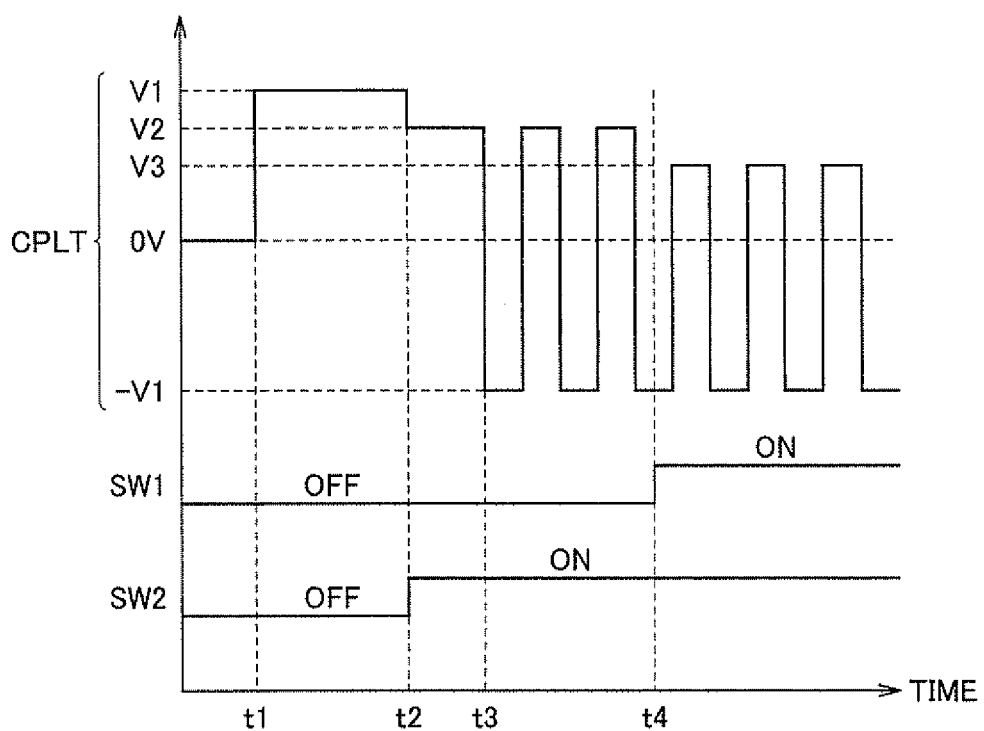
FIG. 8 is a timing chart of the pilot signal and a switch when charging starts.

FIGS. 8 and 9 are timing charts of pilot signal CPLT and switches SW1 to SW3.

FIG. 8 is a timing chart of pilot signal CPLT as well as switches SW1 and SW2 when charging starts. Referring to FIGS. 8 and 6, at time t1, when plug 320 of charging cable 300 is connected to power supply outlet 400 of power supply 402, electric power is received from power supply 402 and EVSE controller 334 generates pilot signal CPLT.

It is noted that, at this point, connector 310 of charging cable 300 is not connected to charging inlet 270 on the vehicle side, the potential of pilot signal CPLT is V1 (for example, 12V), and pilot signal CPLT does not oscillate.

At time t2, when connector 310 is connected to charging inlet 270, the connection between connector 310 and charging inlet 270 is detected based on cable connection signal PISW, and switch SW2 is turned on in response thereto. Then, the potential of pilot signal CPLT is lowered to V2 (for example, 9V) by pull-down resistance R3 of resistance circuit 502.

When the potential of pilot signal CPLT is lowered to V2, EVSE controller 334 causes pilot signal CPLT to oscillate at time t3. The rated current is detected in CPU 512 based on the duty of pilot signal CPLT, and when the preparation for control of charging is completed, switch SW1 is turned on at time 4. Then, the potential of pilot signal CPLT is further lowered to V3 (for example, 6V) by pull-down resistance R2 of resistance circuit 502.

When the potential of pilot signal CPLT is lowered to V3, a current is supplied from EVSE controller 334 to electromagnetic coil 606, and relay 332 of CCID 330 is turned on. Thereafter, although not specifically shown, DFR 260 is turned on and power storage device 150 is charged from power supply 402.

FIG. 9 is a timing chart of pilot signal CPLT and switch SW3 at the time of detection of a break in control pilot line L1. Referring to FIGS. 9 and 6, before time t11, assume that connector 310 of charging cable 300 is removed from charging inlet 270 on the vehicle side and the charging lid is closed. At time t11, the vehicle starts to travel, and when vehicle speed SV is no longer 0, switch SW3 of connecting circuit 504 is turned on.

Here, if there is no break in control pilot line L1, the potential of pilot signal CPLT is lowered to the ground level (substantially 0V) in response to the turning-on of switch SW3. On the other hand, if a break occurs in control pilot line L1, the potential of pilot signal CPLT is not lowered in response to the turning-on of switch SW3. Therefore, a break in control pilot line L1 can be detected by detecting that the potential of pilot signal CPLT is not lowered to the ground level although switch SW3 is turned on.

As described above, power storage device 150 is charged from power supply 402 external to the vehicle by using pilot signal CPLT, and in addition, a break in control pilot line L1 through which pilot signal CPLT is communicated is detected when power storage device 150 is not charged from power supply 402.

Next, the operation of first inverter 210 and second inverter 220 when power storage device 150 is charged from power supply 402 will be described.

FIG. 10 illustrates a zero-phase equivalent circuit of first and second inverters 210 and 220 as well as first and second MGs 110 and 120 shown in FIG. 3. Each of first inverter 210 and second inverter 220 is formed of a three-phase bridge circuit as shown in FIG. 3, and there are eight patterns of on/off combinations of six switching elements in each inverter. In the two of the eight switching patterns, an interphase voltage becomes zero, and such a voltage state is referred to as a zero voltage vector. The zero voltage vector can be understood that the three switching elements of the upper arm are in the same switching state (all on or off), and similarly, the three switching elements of the lower arm are in the same switching state.

During charging of power storage device 150 from power supply 402 external to the vehicle, the zero voltage vector is controlled in at least one of first and second inverters 210 and 220, based on a zero-phase voltage command generated by voltage VAC detected by voltage sensor 171 (FIG. 4) as well as the rated current notified from charging cable 300 by pilot signal CPLT. Therefore, in this FIG. 10, the three switching elements of the upper arm of first inverter 210 are collectively shown as an upper arm 210A, and the three switching elements of the lower arm of first inverter 210 are collectively shown as a lower arm 210B. Similarly, the three switching elements of the upper arm of second inverter 220 are collectively shown as an upper arm 220A, and the three switching elements of the lower arm of second inverter 220 are collectively shown as lower arm 220B.

As shown in FIG. 10, this zero-phase equivalent circuit can be regarded as a single-phase PWM converter that accepts an input of the single-phase AC electric power provided from power supply 402 to neutral point 112 of first MG 110 and neutral point 122 of second MG 120. Accordingly, by changing the zero voltage vector in at least one of first and second inverters 210 and 220 based on the zero-phase voltage command and controlling switching of first and second inverters 210 and 220 so that first and second inverters 210 and 220 operate as the arms of the single-phase PWM converter, the AC electric power supplied from power supply 402 can be converted to DC electric power and power storage device 150 can be charged.

As described above, in the present embodiment, switch SW3 that can electrically connect input terminal T1 that receives pilot signal CPLT in charging inlet 270 to vehicle earth 518 is provided. Switch SW3 is turned on at the time of detection of a break in control pilot line L1, and a break in control pilot line L1 is detected based on whether or not a change in the potential of pilot signal CPLT occurs at that time. Therefore, according to the present embodiment, a break in control pilot line L1 through which pilot signal CPLT is communicated can be detected.

In addition, according to the present embodiment, switch SW3 is turned off during charging of power storage device 150 from power supply 402 external to the vehicle, and therefore, the voltage level of pilot signal CPLT is not affected. Switch SW3 is turned on when connector 310 of charging cable 300 is not connected to charging inlet 270, and therefore, a break in control pilot line L1 can be detected.

In addition, according to the present embodiment, since signal line L2 for detecting a break is branched from the portion connecting control pilot line L1 and input terminal T1 that receives pilot signal CPLT in charging inlet 270, signal line L2 can be routed without changing the structure of charging inlet 270 and the shape of input terminal T1.

In addition, according to the present embodiment, since a break is detected under the conditions that the charging lid is closed and that vehicle speed SV is not 0, together with the determination of non-connection based on cable connection signal PISW, the detection of a break during charging in which pilot signal CPLT is used for control can be reliably prevented.

In addition, according to the present embodiment, since CPU 512 within ECU 170 detects a break, a break can be detected in not only a wire harness within the vehicle but also control pilot line L1 to CPU 512 within ECU 170.

It is noted that, although it is determined whether or not the detection of a break is possible based on cable connection signal PISW, lid signal LID and vehicle speed SV in the above embodiment, it is also possible to determine whether or not the detection of a break is possible based on at least one of these conditions.

In addition, although two CPUs 512 and 514 are provided in the above, the number of CPUs 512 and 514 is not limited thereto. The function of CPUs 512 and 514 may be implemented by one CPU, or the CPUs may be configured to be separated for each smaller function.

It is noted that, although the charging electric power supplied from power supply 402 is provided to neutral point 112 of first MG 110 and neutral point 122 of second MG 120 and first and second inverters 210 and 220 are operated as a single-phase PWM converter to charge power storage device 150 in the above embodiment, a charger designed for charging of power storage device 150 from power supply 402 may be separately provided.

Figure 11:
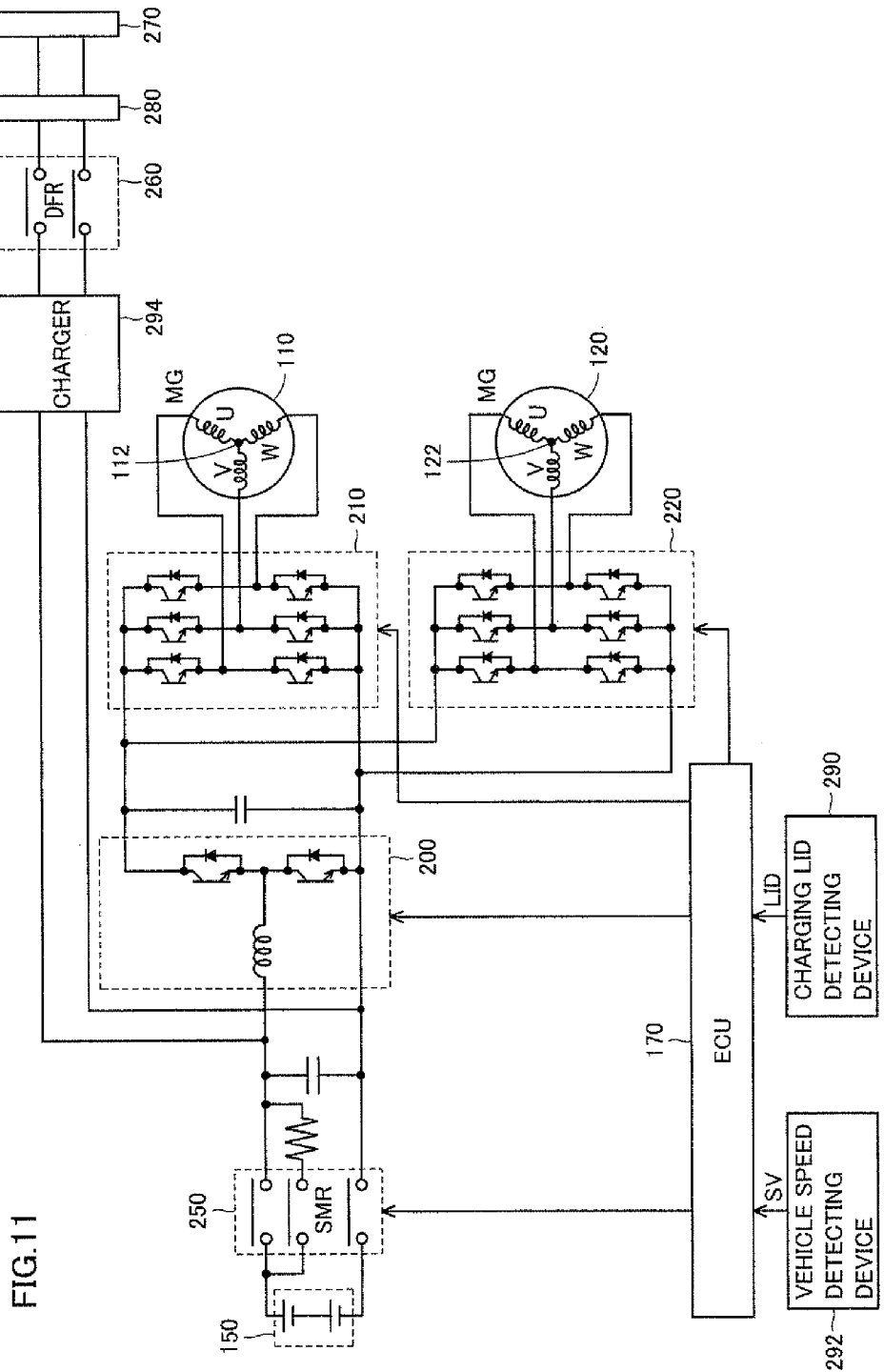
FIG. 11 is an overall configuration diagram of an electrical system in a plug-in hybrid vehicle on which a charger designed for charging of a power storage device from a power supply is mounted.

FIG. 11 is an overall configuration diagram of an electrical system in a plug-in hybrid vehicle on which the charger designed for charging of power storage device 150 from power supply 402 is mounted. Referring to FIG. 11, this electrical system further includes a charger 294, as compared with the electrical system shown in FIG. 3. Charger 294 is connected to a power line between SMR 250 and converter 200, and charging port 270 is connected on the input side of charger 294 with DFR 260 and LC filter 280 interposed therebetween. During charging of power storage device 150 from power supply 402, charger 294 converts charging electric power supplied from power supply 402 to a voltage level of power storage device 150 and outputs the charging electric power to power storage device 150, based on a control signal from ECU 170, to charge power storage device 150.

Figure 12:
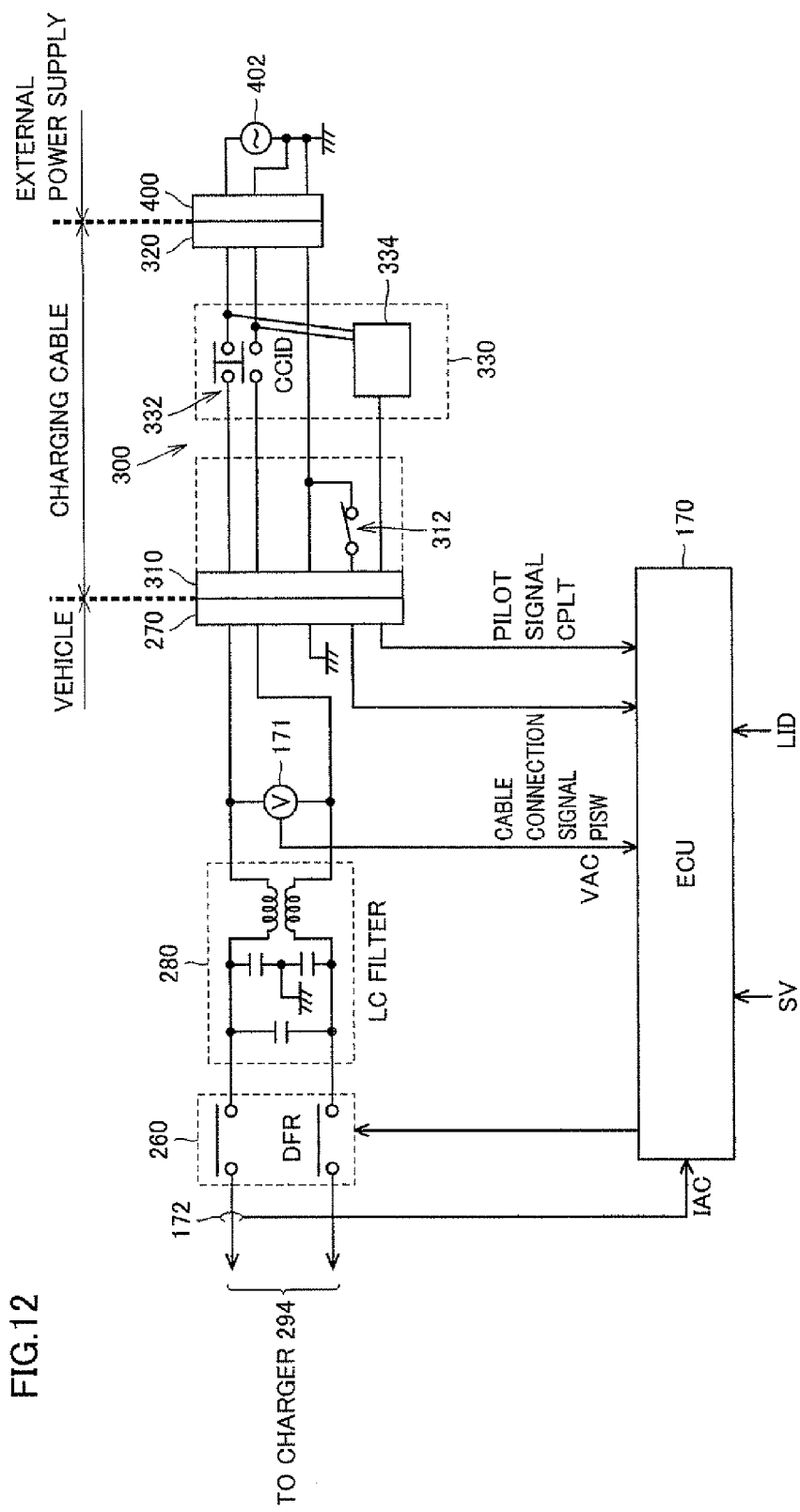
FIG. 12 is a schematic configuration diagram of a portion related to a charging mechanism of the electrical system shown in FIG. 11.

It is noted that, as shown in FIG. 12, a portion related to a charging mechanism of the electrical system shown in FIG. 11 has the same configuration as that of the charging mechanism in the above embodiment shown in FIG. 4.

It is noted that DFR 260 may not be given if charger 294 includes a transformer and the input side of charger 294 is insulated from the output side by the transformer.

In the above embodiment, a series/parallel-type hybrid vehicle has been described, in which motive power of engine 100 is distributed into drive wheel 160 and first MG 110 by employing power split device 130. The present invention, however, is also applicable to other types of hybrid vehicles. In other words, the present invention is also applicable to, for example, a so-called series-type hybrid vehicle using engine 100 only for driving first MG 110 and generating the driving force of the vehicle by employing only second MG 120, a hybrid vehicle in which only regenerative energy among kinetic energy generated by engine 100 is recovered as electric energy, a motor-assisted-type hybrid vehicle in which an engine is used as a main power source and a motor assists the engine as required, and the like.

In addition, although the AC electric power from power supply 402 is provided to neutral points 112, 122 and first and second inverters 210, 220 as well as first and second MGs 110, 120 are operated as the single-phase PWM converter to charge power storage device 150 in the above, a voltage converter and a rectifier designed for charging of power storage device 150 from power supply 402 may be separately connected in parallel to power storage device 150.

Furthermore, the present invention is also applicable to a hybrid vehicle that does not include converter 200.

In addition, the present invention is also applicable to an electric vehicle that does not include engine 100 and travels by using only electric power, and a fuel cell vehicle that further includes a fuel cell as a power supply in addition to a power storage device.

It is noted that, in the above, charging inlet 270 corresponds to an embodiment of "vehicle inlet" in the present invention, and input terminal T1 corresponds to an embodiment of "terminal that receives the pilot signal" in the present invention. In addition, signal line L2 corresponds to an embodiment of "branched line" in the present invention, and switch SW3 corresponds to an embodiment of "switch" in the present invention. Furthermore, CPU 512 corresponds to an embodiment of "break detecting device" in the present invention, and limit switch 312 corresponds to an embodiment of "connection signal generating circuit" in the present invention. Moreover, charging lid detecting device 290 corresponds to an embodiment of "opening/closing detecting device" in the present invention, and vehicle speed detecting device 292 corresponds to an embodiment of "vehicle speed detecting device" in the present invention.

It should be understood that the embodiments disclosed herein are illustrative and not limitative in any respect. The scope of the present invention is defined by the terms of the claims, rather than the above description of the embodiments, and is intended to include any modifications within the scope and meaning equivalent to the terms of the claims.

The invention claimed is:

1. A charging control apparatus for a vehicle configured to be capable of charging a vehicle-mounted power storage device for driving the vehicle from a power supply external to the vehicle, comprising:
    an EVSE controller provided outside said vehicle and configured to be capable of generating a pilot signal whose pulse width is modulated based on a magnitude of a rated current that can be supplied to said vehicle through a charging cable for supplying electric power from said power supply to said vehicle, and sending said pilot signal to said vehicle;
    a resistance circuit mounted on said vehicle, connected to a control pilot line through which said pilot signal from said EVSE controller is communicated, and configured to be capable of changing a potential of said pilot signal stepwise;
    a connecting circuit mounted on said vehicle and configured to be capable of electrically connecting said control pilot line to a vehicle earth;
    a vehicle inlet provided at said vehicle and configured to be capable of connecting to said charging cable:
    a voltage generating circuit configured to be ca able of generating a voltage at said control pilot line; and
    a break detecting device for detecting a break in said control pilot line, based on whether or not a change in the potential of said control pilot line occurs when said connecting circuit electrically connects said control pilot line to said vehicle earth, in the case where said charging cable is not connected to said vehicle inlet.

2. The charging control apparatus for a vehicle according to claim 1, wherein
    said connecting circuit is configured to be capable of electrically connecting, to said vehicle earth, a terminal that receives said pilot signal from said EVSE controller in said vehicle inlet.

3. The charging control apparatus for a vehicle according to claim 2, wherein
    said connecting circuit includes
    a branched line branched from a portion connecting said terminal and said control pilot line in said vehicle inlet, and
    a switch connected between said branched line and said vehicle earth.

4. The charging control apparatus for a vehicle according to claim 1, further comprising:
    a connection signal generating circuit configured to be capable of generating a connection signal indicating connection between said charging cable and said vehicle;
    an opening/closing detecting device for detecting an open or close state of a lid of said vehicle inlet; and
    a vehicle speed detecting device for detecting a speed of said vehicle, wherein
    said break detecting device determines whether or not said charging cable is connected to said vehicle inlet based on at least one of said connection signal and each detection signal from said opening/closing detecting device and said vehicle speed detecting device, and detects a break in said control pilot line when determining that said charging cable is not connected to said vehicle inlet.

5. A vehicle configured to be capable of charging a power storage device for driving the vehicle from a power supply external to the vehicle, comprising:
    a control pilot line configured to be capable of transmitting a pilot signal whose pulse width is modulated based on a magnitude of a rated current that can be supplied to the vehicle through a charging cable for supplying electric power from said power supply to the vehicle;
    a resistance circuit connected to said control pilot line and configured to be capable of changing a potential of said pilot signal stepwise; and
    a connecting circuit configured to be capable of electrically connecting said control pilot line to a vehicle earth;
    a vehicle inlet configured to be capable of connecting to said charging cable;
    a voltage generating circuit configured to be capable of generating a voltage at said control pilot line; and
    a break detecting device for detecting, a break in said control pilot line, based on whether or not a change in the potential of said control pilot line occurs when said connecting circuit electrically connects said control pilot line to said vehicle earth, in the case where said charging cable is not connected to said vehicle inlet.

6. The vehicle according to claim 5, wherein
    said connecting circuit is configured to be capable of electrically connecting, to said vehicle earth, a terminal that receives said pilot signal from outside the vehicle in said vehicle inlet.

7. The vehicle according to claim 6, wherein
    said connecting circuit includes
    a branched line branched from a portion connecting said terminal and said control pilot line in said vehicle inlet, and
    a switch connected between said branched line and said vehicle earth.

8. The vehicle according to claim 5, further comprising:
    an opening/closing detecting device for detecting an open or close state of a lid of said vehicle inlet; and
    a vehicle speed detecting device for detecting a speed of the vehicle, wherein
    said break detecting device determines whether or not said charging cable is connected to said vehicle inlet, based on at least one of a connection signal indicating connection between said charging cable and the vehicle as well as each detection signal from said opening/closing detecting device and said vehicle speed detecting device, and detects a break in said control pilot line when determining that said charging cable is not connected to said vehicle inlet.

9. The vehicle according to claim 5, further comprising a charger for converting the electric power supplied from said power supply to a voltage level of said power storage device and charging said power storage device.

\* \* \* \* \*